United States Patent [19]
Hyatt et al.

[11] Patent Number: 5,943,816
[45] Date of Patent: Aug. 31, 1999

[54] INSECT BAIT STATION

[75] Inventors: Stephanie H. Hyatt, Stockbridge, Ga.; Dang-Sheng Liang, San Ramon, Calif.

[73] Assignee: The Clorox Company, Oakland, Calif.

[21] Appl. No.: 08/990,372

[22] Filed: Dec. 15, 1997

[51] Int. Cl.⁶ .................................................. A01M 1/20
[52] U.S. Cl. ........................... 43/131; 43/132.1; 239/34; 239/57
[58] Field of Search .................. 43/131, 132.1, 43/121; 239/34, 37, 58, 59, 57

[56] References Cited

U.S. PATENT DOCUMENTS

| | | |
|---|---|---|
| 1,769,408 | 7/1930 | Andrews . |
| 1,877,979 | 9/1932 | Savage . |
| 2,959,354 | 11/1960 | Beck . |
| 4,526,320 | 7/1985 | Von Phillipp et al. ............... 239/43 |
| 5,477,640 | 12/1995 | Holtkamp, Jr. .......................... 47/66 |

*Primary Examiner*—Jack W. Lavinder
*Attorney, Agent, or Firm*—Harry A. Paicni

[57] ABSTRACT

An apparatus for liquid bait-toxicant delivery with feeding pores comprising a reservoir, a feeding disk with capillary feeding pores, a base that will seal the feeding pores when the station is closed; designed such that it can be opened or closed by several different arrangements; and a method of delivery of liquid bait-toxicant using capillary feeding pores in direct contact with liquid without using wicking material.

9 Claims, 6 Drawing Sheets

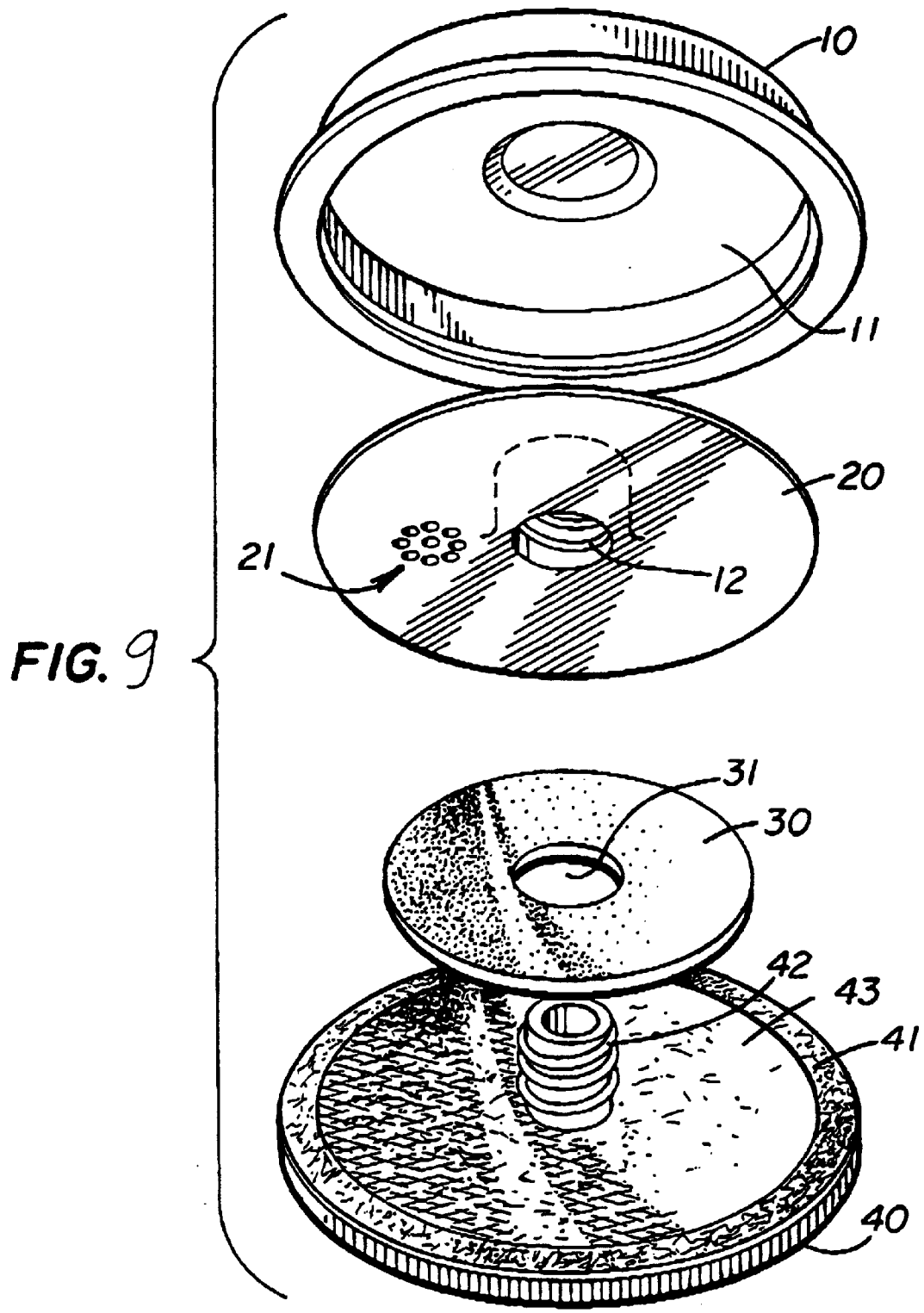

INSECT BAIT STATION

This invention relates to a device for destroying insects. More particularly, it relates to an insect bait station whereby liquid containing insecticide poisons may be administered to insects and whereby insects will remove poison containing material from the station and carry the material back to the insect habitat for feeding of other insects, thereby killing the other insects. This device is for feeding insects, wherein the food (liquid) is supplied by capillary feeding pores directly from an air-tight reservoir.

The present invention relates to a liquid poisoned container which will dispense the liquid containing active ingredient so that insects may feed thereon and has as its principle object to provide a structure that prevents a toxic liquid from becoming spilled, even when the container is upset or in any manner disturbed. It is customary to control insects by placing the poisoned liquid receptacle or dispenser devices in areas from which from time to time may be visited by children, animals or birds. With the present improved structure, access to the toxic liquid is avoided.

Liquid food is much preferred than solid by many insects, such as ants, wasps, butterflies, moths and many others. Cockroaches also like liquid food supplies. Therefore, a liquid-based bait is a preferred delivery system for toxic active ingredients. The delivery system with feeding pores offers a new approached to delivery to insects and has distinct advantages over previous systems. It solves the sticking and clogging problem caused by evaporation as associated with some wicking systems. It can be used with varying amounts of liquid.

The vacuum in the air-tight reservoir holds the liquid in place, thus allowing relatively large pores to be placed on the bottom of the reservoir for insects to feed (drink) through. The design of the reservoir can be any shape and the placement and design of the feeding pores can also vary as long as all liquid can be removed through the pores.

BACKGROUND OF THE INVENTION

The art is generally aware of insect bait for feeding stations having a base joined to a cover that extends over the base to produce a hollow body. Woodruff et al., U.S. Pat. No. 4,563,836 and Brandli, U.S. Pat. No. 5,048,225 are examples of such insect feeding stations that are intended to contain a poisoned solid bait, with much of the structure of the insect feeding station intended to restrict access to the poisoned bait by a user, pet, or the like. Mullen et al., U.S. Pat. No. 5,090,153 is of similar structure but uses food or a pheromone to lure insects, which then are trapped in a sticky material applied to the central portion of the base.

Generally similar traps or feeding stations are disclosed in Rhodes, U.S. Pat. 5,152,097; Warner, U.S. Pat. No. 5,231,792; Tippey, U.S. Pat. No. 1,856,200; Gentile, U.S. Pat. No. 4,793,093; Harroun, U.S. Pat. No. 2,123,995; and Howard, U.S. Pat. 884,928.

A number of devices are known in the art that are specifically adapted to contain insect baits or poisons in liquid form. For example, Demarest et al., U.S. Pat. No. 5,033,229, provides an absorbent mat that serves as the floor of a circular structure. Insects gain access to the floor by crawling through ports located in the side of the structure. A reservoir above the circular mat is adapted to allow a liquid bait to seep down onto the mat and soak into it. Schlesinger, U.S. Pat. No. 1,573,278, includes a central well for holding a liquid insect poison and a hollow, cylindrical wick that lines and extends upwardly from the sides of the well to a cover. Liquid can soak through the wick to wet a fringe that surrounds the wick and is exposed to feeding ants. The wick is closed by the cover, which also extends over the rest of the bait station. The wick, together with the cover, is intended to prevent spillage of the liquid poison, should the device be turned on its side. The cover, together with a base, provides an enclosed feeding chamber surrounding the well and its cylindrical wick.

An ongoing need still exists in the art for an economical and easily manufactured insect bait station that can contain a liquid insect bait in such a way as to minimize the chance of spillage and minimize the chance of access by children while, at the same time, providing for access to the liquid bait by targeted insects. Liquid insect baits offer various advantages with respect to ants, wasps, cockroaches, and other insects that can easily assimilate food when it is in a liquid or liquifiable form.

SUMMARY OF THE INVENTION

The present invention is summarized in that it is an insect bait station for offering a liquid insect bait with or without a toxic active ingredient to target insects as provided which will provide access to the liquid through small capillary feeding holes without the use of a wick or wicking material so that insects may feed thereon and as its principle object will provide a structure will prevent the poison liquid from becoming spilled, even though the container is upset or in any other manner disturbed. The insect bait station of the present invention includes an air-tight hollow body liquid reservoir cover joined to the feeding disk, said feeding disk containing small openings or pores from which liquid is accessible to the target insect, as by surface tension, and a corresponding base having peripheral sealing means to cooperate with the edge of the cover and an internal sealing disk to cooperate with sealing the feeding holes in the feeding disk when the station is closed and at a sealed condition.

Whereas liquid baits have been used in the prior art, the reservoir and feeding means of the present invention are heretofore unknown and hence unique for providing liquid to insects while limiting access to the liquid and the feeding disk by children, animals, birds and the like. Therefore, the preferred access means includes a feeding disk in cooperation with an air-tight reservoir containing the liquid, said feeding disk having small feeding holes or pores for the delivery of the liquid bait that will be accessible to the targeted insects after the bait station has been opened and activated.

Other features and advantages of this invention will become apparent in the following detailed description of the preferred embodiments of this invention, with reference to the accompanying drawings.

BRIEF DESCRIPTION OF THE DRAWINGS

FIG. 9 is a perspective exploded view of another preferred embodiment of a bait station of the present invention showing grouped feeding pores.

DETAILED DESCRIPTION OF THE PREFERRED EMBODIMENTS

Accordingly, the apparatus for the liquid bait station with insect feeding pores of the present invention comprises a reservoir, a feeding disk with feeding pores, a base that will seal the feeding pores when the station is closed. The station is designed such that it can be opened or closed by several means. Included among these means are rotating or pulling the reservoir from the base.

Figure 1:
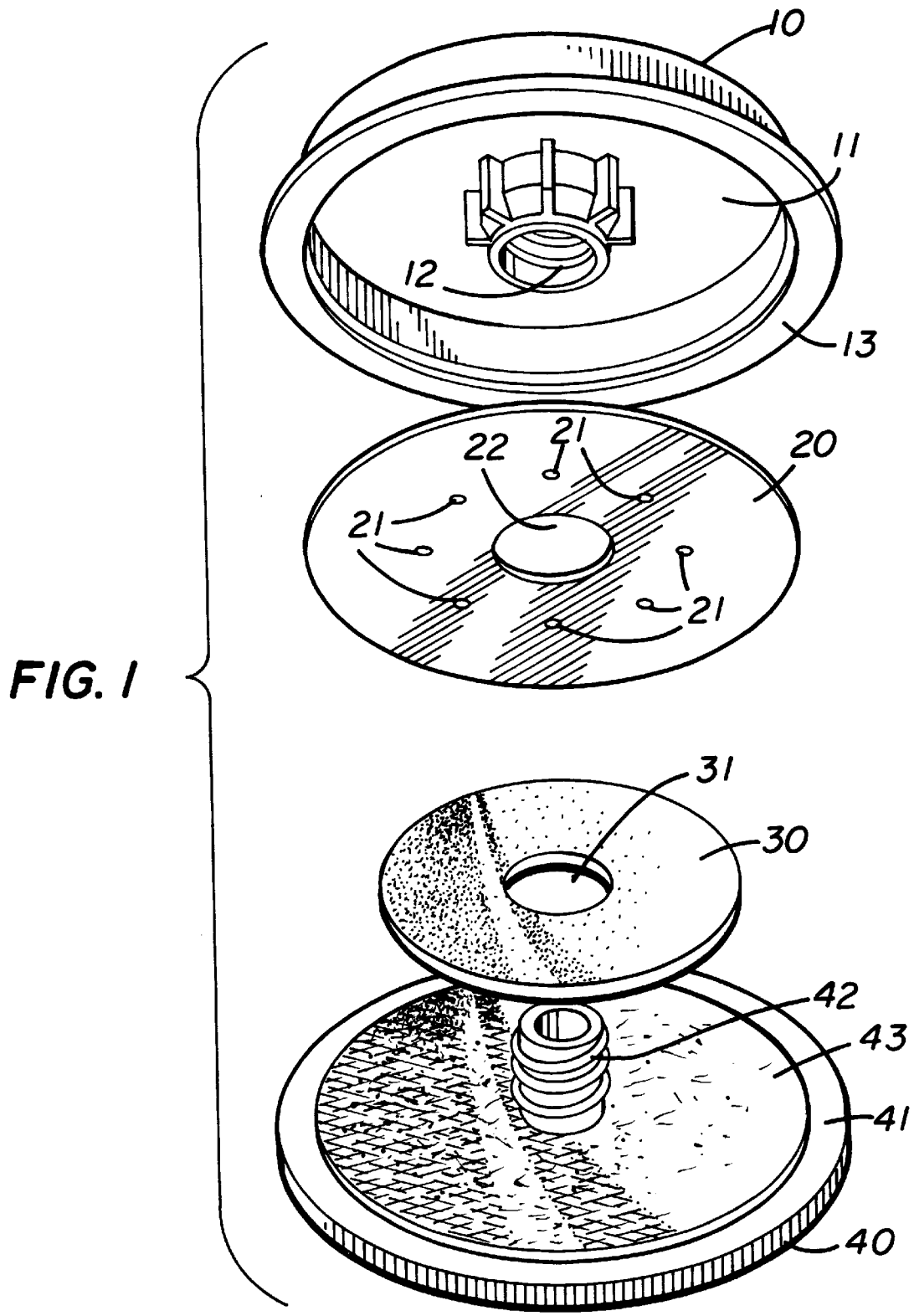
FIG. 1 is a perspective exploded view of a preferred embodiment of a bait station of the present invention.
Figure 2:
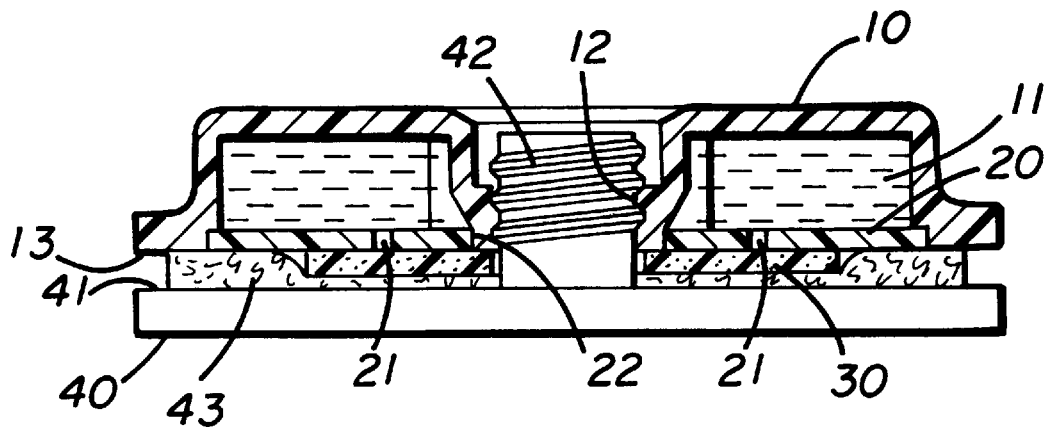
FIG. 2 is a cross-sectional view of the bait station as shown in FIG. 1 of the present invention in a closed configuration.
Figure 3:
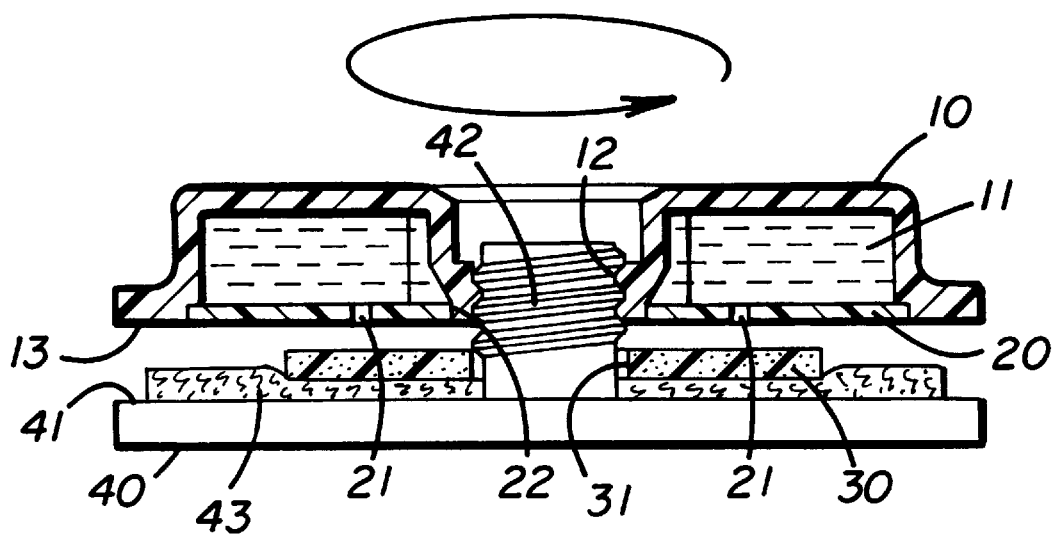
FIG. 3 is a cross-sectional view of the bait station as shown in FIG. 1 in an open configuration ready to deliver liquid bait and showing the relative rotation of the cover member to the base member.
Figure 4:
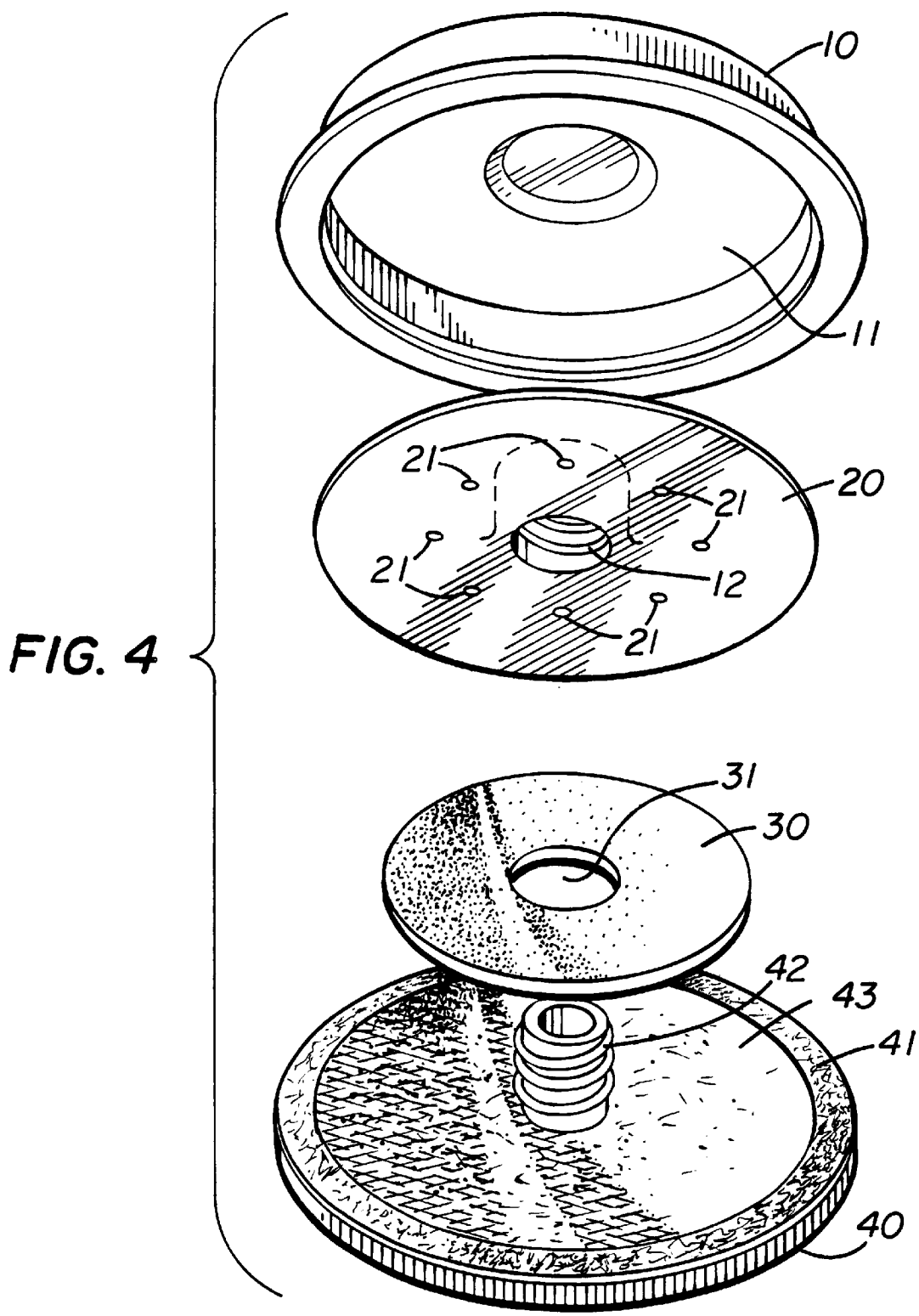
FIG. 4 is a perspective exploded view of an alternative embodiment of a bait station of the present invention.

FIG. 1 shows a preferred embodiment of an apparatus for receiving a liquid bait which contains an insecticidal ingredient of this invention. The apparatus includes an air-tight reservoir 11 in the top member 13 for holding the liquid bait. FIG. 1 shows an embodiment in which the closure threaded receiving portion 12 is affixed to the inside top 13 of the apparatus. In FIG. 4, the threaded receiving member 12 is part of the feeding disk 20.

The reservoir 11 preferably is a cylindrical dome shaped member having an upper closed end and a lower open end, the lower open end having an outwardly extending annular flange having an inside diameter identical to the outside diameter of the feeding disk 20. The opening 22 of the feeding disk 20 cooperates with the threaded receiving portion 12 affixed to the inside of the top 13. When positioned after filling of the reservoir with liquid bait, the feeding disk 20 is securely joined to the inside of the top 13 in an air-tight and liquid-tight relation to form a hollow body reservoir 11.

Figure 5:
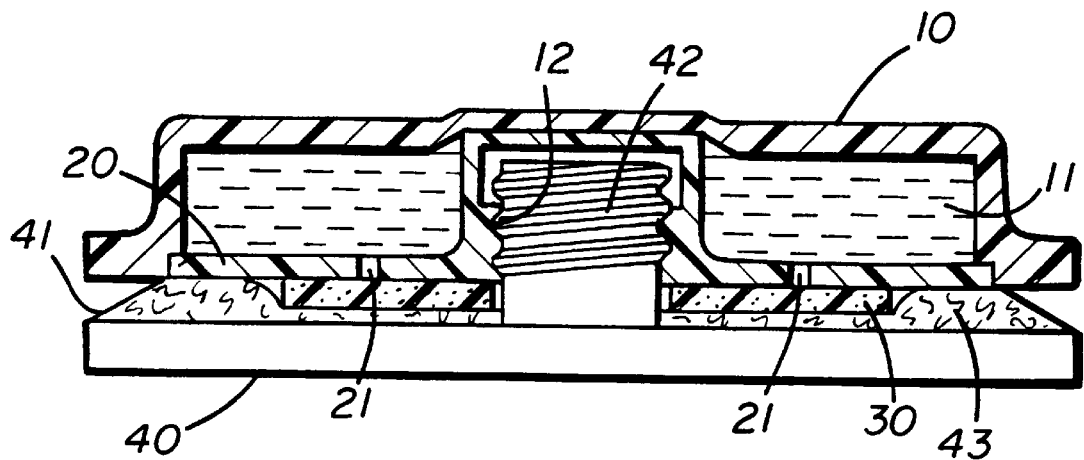
FIG. 5 is a cross-sectional view of the bait station as shown in FIG. 4 of the present invention in a closed configuration
Figure 6:
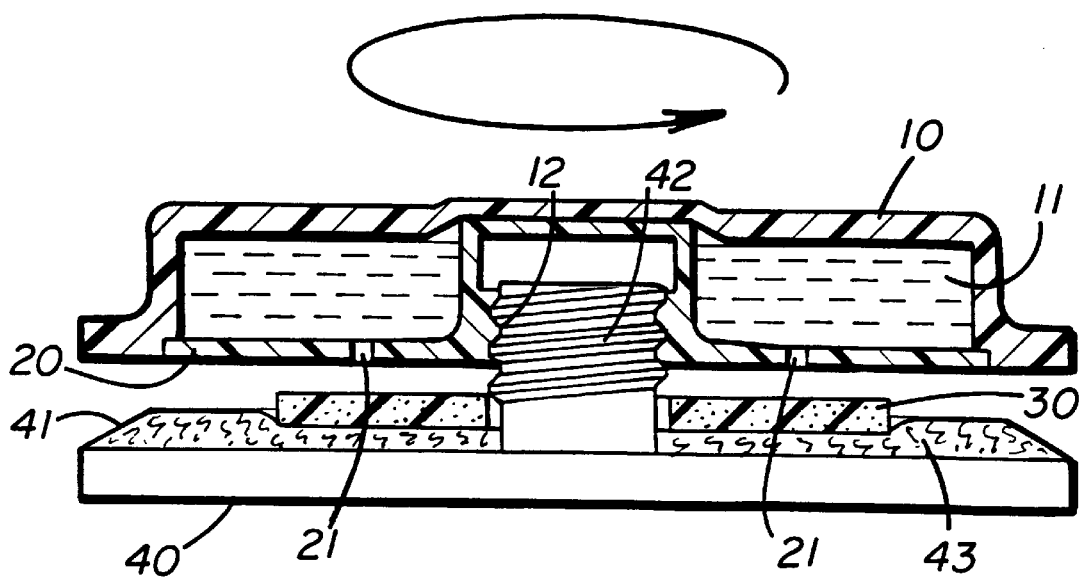
FIG. 6 is a cross-sectional view of the bait station as shown in FIG. 4 in an open configuration ready to deliver liquid bait and showing the relative/rotation of the cover member to the base member.

The base 40 has a floor 43 and an annular flange 41 having an outside diameter which is identical to the outside diameter of the top 13. Centrally located on the base 40 is a threaded center post for cooperation with the threaded receiving member 12 in the top 14. The sealing disk 30 is positioned with opening 31 over the threaded post 42 on the base and securely positioned thereon. The sealing disk 30 is of sufficient diameter to seal the feeding holes 21 on the feeding disk 20 when the bait station of this invention is assembled and in a closed configuration, FIG. 5.

In operation, the threaded post 42 is placed in the threaded receiving member 12 in the top 10 and rotated such that the two members, the top 13 and the base 40 are brought together, causing the sealing disk 30 to seal the feeding holes 21 and the annular flange of the top member 13 to interact and seal with the annular flange of the base 41.

An alternative arrangement for the station includes a closing mechanism which is located alternatively in the center or at the edge of the station. A matching mechanism will be located on the inside of the station. When the cover and the base of the station are used together, the station can be opened (preferably in variable heights) to leave a narrow gap as an access feeding area between the base 40 and the cover 13 to be used as an entrance for the insects accessing the liquid bait being dispensed from the small openings 21 in the feeding disk. By using a narrow gap as an entrance, this opening will be too small for children's fingers to access the inside of the station.

In the alternative design FIG. 4, it can be seen that the threaded closure receiver is placed in the feeding disk such that after the feeding disk is securely affixed to the reservoir cap 10, the threaded closure can cooperate with the post 42 of the base and the bait station can be closed or opened, as desired.

Figure 7:
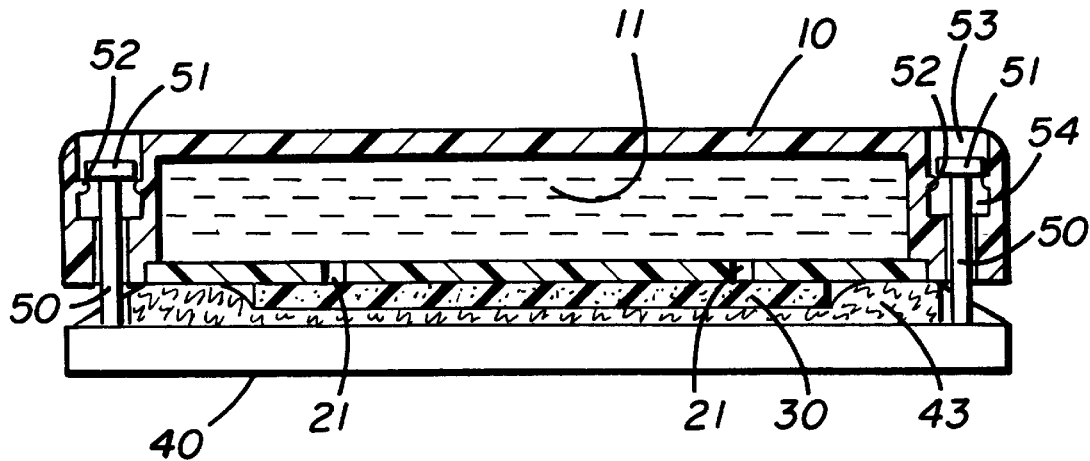
FIG. 7 is a cross-sectional view of an alternative embodiment of the bait station of the present invention in a closed configuration.

FIG. 7 shows an alternative embodiment of an apparatus for receiving a liquid bait for dispensing according to this invention. The apparatus includes a top member having an air-tight reservoir 11 for holding the liquid bait. FIG. 7 shows an embodiment in which the means for closing includes a push-pull closure incorporated into the flange of the top and the flange 41 of the base 40.

Figure 8:
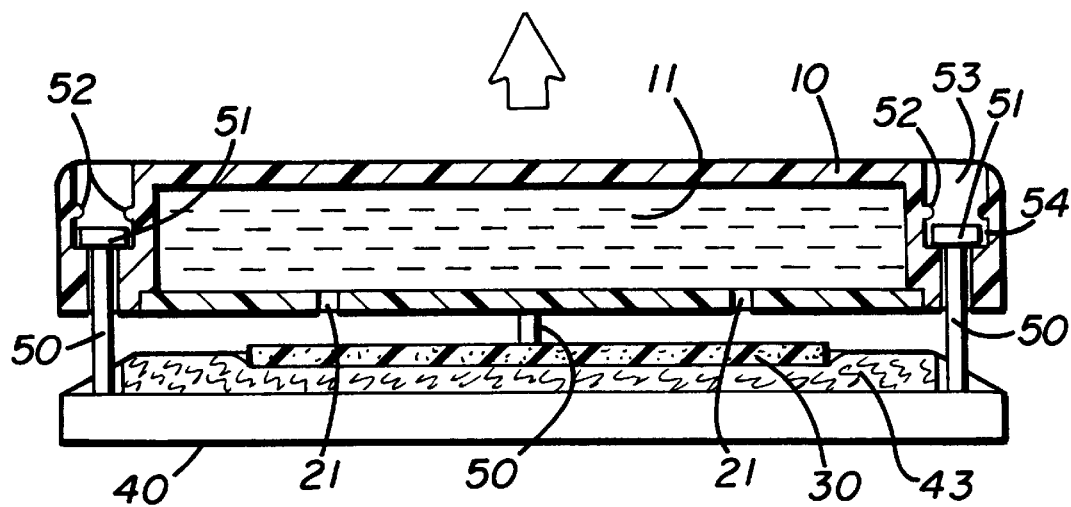
FIG. 8 is a cross-sectional view of an alternative embodiment of the bait station of the present invention in an open configuration.

The push-pull closure member comprises the support post 50, the top-stop 51, the indent stop 52, the upper space 53 and the lower locking space 54. The support post 50 is securely affixed to the base flange 41 and extends upwardly into the top flange and into the upper space 53. The top-stop 51 is located at the top of the support post 50 in a closed configuration in the upper space 53. When in the locked open position FIG. 8, the top-stop 51 is moved down below the indent top 52 and resides in the lower locking space 54. Preferably, a plurality of push-pull closure members are located around the flanges.

It is preferred that the threaded closure or push-pull closure of the present invention is designed so that the top can not be entirely removed once assembly has taken place following the manufacture. As an alternative, an absorbent fiber ring can be used around the flange of the base to prevent leakage of any liquids that may fall out of the feeding holes if the device is shaken.

While preferred forms of the invention have been shown in the drawings and have been described above, variations will be apparent to those skilled in the art, and the usefulness of the bait station with respect to other insects will also be readily apparent to those skilled in the art. Consequently, the invention should not be construed as limited to the specific forms shown and described. Instead, the invention should be understood in terms of the following claims.

In order for the delivery system to be effective, the size of the pores can be large without having liquid leaking out. Therefore, the apparatus of the present invention can be used for a wide variety of liquid feeding insects, as well as other small animals. Thus, as a bait station or as a liquid feeding apparatus, the pore system may vary greatly. When a certain amount of liquid is removed through the feeding pores by the insect, an air bubble is formed and rises to the top of the reservoir thus allowing further liquid to drop down through the capillary pores to be available on the feeding pores without leaking liquid. Because of the liquid over the feeding pores within the reservoir, evaporation of water through the pores will not occur and cause a concentration of material, such as sugar, to clog the feeding pores as liquid flows freely through the system. The liquid is retained in place by capillary action and the vacuum in the reservoir made available for the insect to feed upon demand. Surface tension of liquid bait determines the acceptable size of the capillary pores leading from the liquid reservoir to the surface of the feeding disk. The pore size may range from about 0.01 to about 3.0 millimeters (mm), preferably between about 0.1 to about 2.0 mm, and most preferably between about 0.5 to 1.0 mm.

Distribution of a plurality of capillary feeding pores, as illustrated in FIG., 1 illustrates the pores 21 to be symmetrically distributed in a circle about the center opening. This should not be considered as a limitation on the distribution of feeding pores on the feeding disk. Another preferred arrangement of the feeding pores is for as a grouping of the pores in a portion of the feeding disk so as to insure maintaining a liquid cover over the area of the pores when said station is placed on an unlevel surface. Entrance of air to the pores would allow leakage from the pores. Therefore, it is necessary to maintain a liquid cover over the pores and allow only capillary action to supply the liquid through the pores to the feeding insect.

It is important to note that the insect feeding device of the present invention is for liquids. When the food is a liquid, it is supplied by capillary feeding pores directly from the reservoir by capillary action without need for a wicking action through a wick to supply the food. Hence, the liquid supplied to the insect is available directly from the reservoir.

What is claimed is:

1. A liquid delivery bait-toxicant station for the control of insects comprising:

(a) a cover having an upper liquid reservoir for containing liquid bait, (b) a feeding disk securely attached to the underside of said reservoir and wherein said feeding disk contains a plurality of feeding pores, (c) a base portion movably attached to said cover and conforming to the shape of said cover; wherein said base portion has a peripheral sealing means to cooperate with an edge of said cover and an internal sealing disk to cooperate to seal the feeding pores in the feeding disk when said cover and said base are in a closed configuration, (d) an insect access feeding area between said cover and said base portion and wherein said base portion is a support structure having ramped access to said insect access feeding area when the delivery station is in an open configuration exposing said feeding disk.

2. The liquid delivery bait-toxicant station according to claim 1 wherein said feeding pores are capillary pores leading from the liquid reservoir to the surface of the feeding disk.

3. The liquid delivery bait-toxicant station according to claim 1 wherein said feeding pores are capillary pores arranged to be covered with liquid in the reservoir leading from the liquid reservoir to the surface of the feeding disk.

4. The liquid delivery bait-toxicant station according to claim 2 wherein said capillary pores leading from the liquid reservoir to the surface of the feeding disk have diameters of from 0.01 to 3.0 millimeters.

5. The liquid delivery bait-toxicant station according to claim 1 wherein said plurality of feeding pores are arranged in an even circular pattern about the feeding disk.

6. The liquid delivery bait-toxicant station according to claim 1 wherein said plurality of feeding pores are arranged in a grouping in one portion of the feeding disk so as to maintain a liquid cover thereover when said station is placed on an unlevel surface.

7. The liquid delivery bait-toxicant station according to claim 1 having a means for variably raising and lowering said cover portion relative to said base portion to achieve an open configuration to expose the access feeding area.

8. The liquid delivery bait-toxicant station according to claim 7 wherein means for raising and lowering said cover portion relative to said base portion to achieve an open configuration to expose the access feeding area is a threaded center post and receiving member.

9. The liquid delivery bait-toxicant station according to claim 7 wherein means for raising and lowering said cover portion relative to said base portion to achieve an open configuration to expose the access feeding area is located near an edge of the station.

* * * * *